United States Patent
Choi

(10) Patent No.: US 10,693,203 B2
(45) Date of Patent: Jun. 23, 2020

(54) METAL-AIR BATTERY AND METAL-AIR BATTERY MODULE

(71) Applicant: Samsung Electronics Co., Ltd., Suwon-si, Gyeonggi-do (KR)

(72) Inventor: Kyounghwan Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 746 days.

(21) Appl. No.: 14/886,162

(22) Filed: Oct. 19, 2015

(65) Prior Publication Data

US 2016/0322684 A1 Nov. 3, 2016

(30) Foreign Application Priority Data

Apr. 28, 2015 (KR) .................. 10-2015-0059775

(51) Int. Cl.
*H01M 12/08* (2006.01)
*H01M 4/72* (2006.01)
*H01M 4/86* (2006.01)

(52) U.S. Cl.
CPC ............. *H01M 12/08* (2013.01); *H01M 4/72* (2013.01); *H01M 2004/8689* (2013.01); *Y02E 60/128* (2013.01)

(58) Field of Classification Search
CPC .......... H01M 12/08; H01M 2004/8689; Y02E 60/128
See application file for complete search history.

(56) References Cited

U.S. PATENT DOCUMENTS

| 7,824,806 | B2 | 11/2010 | Visco et al. | |
| 8,722,256 | B2 | 5/2014 | Narula et al. | |
| 8,871,394 | B1 * | 10/2014 | Garcia | H01M 10/0422 |
| | | | | 429/403 |
| 9,509,027 | B2 | 11/2016 | Park et al. | |
| 9,634,365 | B2 | 4/2017 | Park et al. | |
| 2006/0210865 | A1 * | 9/2006 | Inoue | H01M 8/0254 |
| | | | | 429/434 |
| 2012/0237838 | A1 | 9/2012 | Uesaka | |
| 2013/0115527 | A1 | 5/2013 | Au | |
| 2014/0178776 | A1 | 6/2014 | Mitsuoka et al. | |
| 2014/0335392 | A1 | 11/2014 | Visco et al. | |
| 2014/0356737 | A1 | 12/2014 | Song | |
| 2015/0140452 | A1 | 5/2015 | Park et al. | |

FOREIGN PATENT DOCUMENTS

| JP | 2013-073765 A | 4/2013 |
| KR | 1020130053818 A | 5/2013 |
| KR | 1020150058616 A | 5/2015 |
| KR | 1020160031830 A | 3/2016 |

* cited by examiner

*Primary Examiner* — Ladan Mohaddes
(74) *Attorney, Agent, or Firm* — Cantor Colburn LLP

(57) ABSTRACT

A metal-air battery includes a negative electrode, a positive electrode, an ion conducting membrane disposed between the negative electrode and the positive electrode, a positive electrode current collector disposed on a surface of the positive electrode and including a plurality of pores, and an insulating gas diffusion layer (GDL) disposed on a surface of the positive electrode current collector. A metal-air battery module includes a plurality of metal-air batteries.

19 Claims, 5 Drawing Sheets

METAL-AIR BATTERY AND METAL-AIR BATTERY MODULE

CROSS-REFERENCE TO RELATED APPLICATION

This application claims priority to and the benefit of Korean Patent Application No. 10-2015-0059775, filed on Apr. 28, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to a metal-air battery and a metal-air battery module.

2. Description of the Related Art

A metal-air battery generally includes a negative electrode that allows deposition/dissolution of metal ions, a positive electrode that oxides/reduces oxygen in air, and a metal ion conducting medium between the positive electrode and the negative electrode.

Since the metal-air battery may use a metal as the negative electrode and does not need to store air, which is used as the positive electrode active material, the metal-air battery may have a high capacity. The metal-air battery has a high theoretical specific energy of about 3,500 Wh/kg or greater. Nonetheless, there remains a need for improved metal-air battery materials to provide batteries having improved specific energy and energy density.

SUMMARY

Provided is a metal-air battery including a porous current collector and an insulating gas diffusion layer (GDL).

Provided is a metal-air battery module including a plurality of metal-air batteries.

Additional aspects will be set forth in part in the description which follows and, in part, will be apparent from the description.

According to an aspect, a metal-air battery includes: a negative electrode; positive electrode; an ion conducting membrane disposed between the negative electrode and the positive electrode; a positive electrode current collector disposed on a surface of the positive electrode and including a plurality of pores; and an insulating gas diffusion layer (GDL) disposed on a surface of the positive electrode current collector.

According to another aspect, a metal-air battery module includes: a plurality of metal-air batteries stacked on one another; and at least one inner insulating gas diffusion layer (GDL) disposed between opposite surfaces of the plurality of metal-air batteries that are stacked on one another.

Also disclosed is a metal-air battery module including: a plurality of the metal-air batteries disposed on one another.

Also disclosed is a metal-air battery module including: a top cell; and at least one middle cell disposed between the top cell and a bottom cell, wherein the top cell and the bottom cell each include a negative electrode, a positive electrode, an ion conducting membrane disposed between the negative electrode and the positive electrode, a positive electrode current collector disposed on a surface of the positive electrode and including a plurality of pores, and an insulating gas diffusion layer disposed on an outer surface of the positive electrode current collector, and wherein each middle cell includes a negative electrode, a positive electrode, an ion conducting membrane disposed between the negative electrode and the positive electrode, a positive electrode current collector disposed on a surface of the positive electrode and including a plurality of pores, a first insulating gas diffusion layer disposed on an upper surface of the positive electrode current collector, and a second insulating gas diffusion layer disposed on an lower surface of the positive electrode current collector.

Also disclosed is a method of manufacturing the metal-air battery, the method including: disposing an ion conducting membrane on a negative electrode; disposing a positive electrode on the ion conducting membrane; disposing a positive electrode current collector on the positive electrode; and disposing an insulating gas diffusion layer on a surface of the positive electrode current collector to manufacture the metal-air battery.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
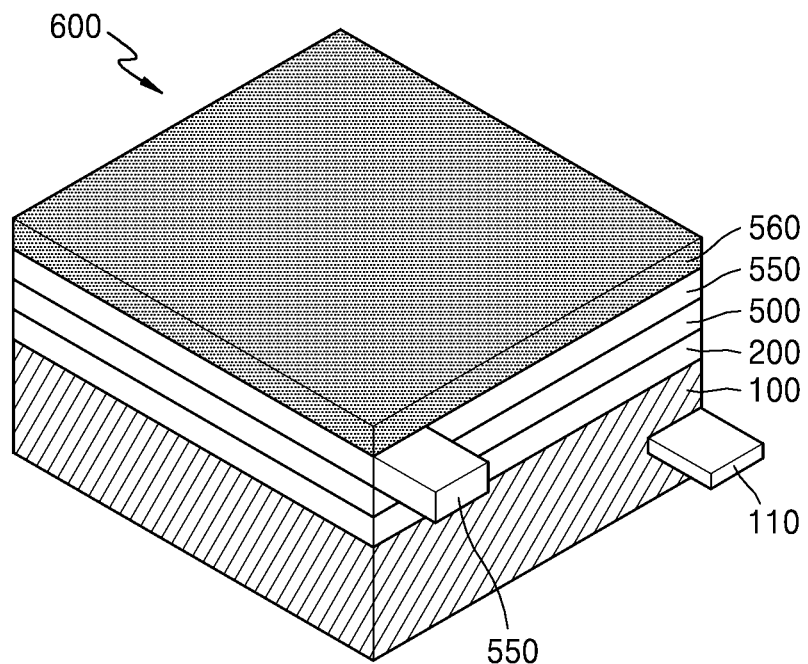
FIGS. 1A and 1B are schematic views illustrating structures of an embodiment of a metal-air battery.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the disclosed embodiments. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, according to one or more exemplary embodiments, a metal-air battery and a metal-air battery module will be described in further detail.

A metal-air battery uses a gas diffusion layer (GDL) to supply oxygen air to a positive electrode. In the related art, a conductive GDL, such as a carbon fiber-based GDL or carbon paper has been used as the GDL. The carbon fiber-based GDL is advantageous as it has both electrical conductivity and gas diffusivity at the same time. However, due to the volume and weight of the carbon fiber-based GDL, the energy density of the metal-air battery including the carbon fiber-based GDL may be limited.

In an embodiment, a metal-air battery includes: a negative electrode; a positive electrode; an ion conducting membrane disposed between the negative electrode and the positive electrode; a positive electrode current collector disposed on a surface of the positive electrode and including a plurality of pores; and an insulating gas diffusion layer (GDL) disposed on a surface of the positive electrode current collector.

The insulating GDL included in the metal-air battery may serve as a path for supplying external air to the positive electrode. In addition, the insulating GDL included in a metal-air battery module including a plurality of metal-air batteries stacked on one another may serve as a path for supplying external air to opposing surfaces of each of the plurality of metal-air batteries stacked on one another.

In the metal-air battery, the positive electrode current collector is highly porous and includes a plurality of pores, and thus may serve as an air supply path for delivering the air from the insulating GDL to the positive electrode.

The positive electrode current collector including the plurality of pores may have a low weight per unit area due to its high porosity. In addition, the positive electrode current collector may be thinner than the insulating GDL, which facilitates adjusting a thickness thereof. In an embodiment, the insulating GDL preferably does not include an additional conductive material to provide the battery with conductivity, and thus may also have a low weight per unit area and the thickness thereof may be easily selected.

In this regard, the metal-air battery including the positive electrode current collector including the plurality of pores and the insulating GDL may have a lightweight air supply structure, and accordingly, the metal-air battery may have an increased specific energy (energy per unit weight) and energy density compared to that of a metal-air battery which includes a conductive gas diffusion layer.

The plurality of pores in the positive electrode current collector may penetrate the positive electrode current collector to form a gas flow path through the positive electrode current collector. Penetrate, as used herein, means that a pore or a plurality of connected pores provides a path through which a gas, such as air, may diffuse or otherwise transport from a first side of the positive electrode current collector to an opposite second side. Accordingly, the positive electrode current collector may deliver air from the insulating GDL to the positive electrode via the gas flow path. A type or shape of the gas flow path is not particularly limited. For example, the gas flow path may be formed by interconnection of a plurality of pores or by a through-hole formed in the positive current collector.

The plurality of pores included in the positive electrode current collector may be regularly arranged or irregularly arranged therein. When the plurality of pores included in the positive electrode current collector is regularly arranged, control of an amount of the air passing through the positive electrode current collector may be facilitated.

The positive electrode current collector may include at least one folded portion, and accordingly, air may be easily supplied to various configurations of the positive electrode. For example, the positive electrode current collector may include at least one folded portion so that the positive electrode current collector surrounds the positive electrode. For example, the positive electrode current collector may include a plurality of folded portions so that the positive electrode current collector surrounds not only opposite surfaces of the positive electrode, but also a surface that contacts both of the opposite surfaces of the opposing insulating gas diffusion layers.

The positive electrode current collector may comprise a metal, may comprise an alloy which comprises the metal, and may consist of a metal or an alloy. In this regard, the positive electrode current collector may provide better conductivity than a carbon-based conductive material, such as a carbon paper, and thus may provide reduced electrical resistance.

The positive electrode current collector may include at least one selected from copper, stainless steel, aluminum, titanium, gold, platinum, and an alloy thereof, but is not limited thereto. Any suitable metal or alloy that may be used as a current collector in the art and having a suitable corrosion resistance may be used.

The positive electrode current collector may be at least one selected from a perforated metal, a punched metal, a porous metal, a foamed metal, and a mesh metal, a perforated alloy, a punched alloy, a porous alloy, a foamed alloy, and a mesh alloy, but is not limited thereto. Any suitable metal or alloy having a plurality of pores may be used.

The positive electrode current collector may have a thickness of 100 μm or less. The thinner the positive electrode current collector is, the greater the specific energy (energy per unit weight) the metal-air battery may have. For example, the positive electrode current collector may have a thickness in a range of about 1 μm to about 100 μm, about 1 μm to about 80 μm, about 1 μm to about 60 μm, about 1 μm to about 40 μm, or about 1 μm to about 20 μm, or about 1 μm to about 100 μm, about 2 μm to about 80 μm, about 3 μm to about 60 μm, about 4 μm to about 40 μm, or about 5 μm to about 20 μm.

The positive electrode current collector may have porosity of at least about 50%, at least about 55%, at least about 60%, at least about 70%, at least about 75%, or at least about 80%, and the porosity of the positive electrode current collector may be about 50% to about 99%, about 55% to about 95%, or about 50% to about 90%, based on a total volume of positive electrode collector. A porosity of the positive electrode current collector indicates the volume, in percentage, of the pores with respect to the total volume of the positive electrode current collector. When the positive electrode current collector has high porosity, air supply is facilitated and a weight of the positive electrode current collector is reduced.

A pore of the positive electrode current collector may have a diameter of at least 0.01 micrometers (μm). For example, the pore of the positive electrode current collector may have a diameter in a range of about 0.01 μm to about 10 millimeters (mm), about 0.1 μm to about 10 mm, about 1 μm to about 10 mm, about 10 μm to about 10 mm, or about 100 μm to about 10 mm.

The positive electrode current collector may have a density (weight per unit volume) of 2.0 grams per cubic centimeter ($g/cm^3$) or less. Since the positive electrode current collector includes the plurality of pores, the positive electrode current collector may have a density of 2.0 $g/cm^3$ or less. For example, the positive electrode current collector may have a density in a range of about 0.01 $g/cm^3$ to about 2.0 $g/cm^3$, about 0.05 $g/cm^3$ to about 1.0 $g/cm^3$, or about 0.1 $g/cm^3$ to about 1.0 $g/cm^3$. A copper foil with no pores may have a weight per unit volume of 8.94 $g/cm^3$, whereas a porous copper foil that has porosity of 80% and includes a plurality of pores may have a weight per unit volume of 1.8 $g/cm^3$.

The insulating GDL in the metal-air battery may be a porous organic layer, and accordingly, may be prepared in various forms and a thickness thereof may be easily adjusted. The organic layer may include an organic compound.

The insulating GDL may include at least one polymer selected from a homopolymer, a block copolymer, and a random copolymer.

In detail, the insulating GDL may include at least one polymer selected from, or a polymer derived from at least one polymer selected from, polyethylene, polypropylene, polyethyleneterephthalate, polyphenylene sulfide, poly(2-vinyl pyridine), polytetrafluoroethylene, a tetrafluoroethylene-hexafluoropropylene copolymer, polychlorotrifluoroethylene, a perfluoroalkoxy copolymer, a fluorinated cyclic ether, polyethyleneoxide diacrylate, polyethyleneoxide dimethacrylate, polypropyleneoxide diacrylate, polypropyleneoxide dimethacrylate, polymethyleneoxide diacrylate, polymethyleneoxide dimethacrylate, polyalkyldiol diacrylate (e.g., poly($C_{1-6}$alkyl)diol diacrylate), polyal kyldiol dimethacrylate (e.g., poly($C_{1-6}$alkyl)diol dimethacrylate, polydivinylbenzene, polyether, polycarbonate, polyimide, polyester, polyvinylchloride, polyimide, polycarboxylic acid, polysulfonic acid, polyvinyl alcohol, polysulfone, polystyrene, poly(p-phenylene), polyacetylene, poly(p-phenylene vinylene), polyaniline, polypyrrole, polythiophene, poly(2,5-ethylene vinylene), polyacene, poly(naphthalene-2,6-diyl), polyethylene oxide, polypropylene oxide, polyvinylidene fluoride, a copolymer of vinylidene fluoride and hexafluoropropylene, poly(vinyl acetate), poly(vinylbutyral-co-vinyl alcohol-co-vinyl acetate), poly(methyl methacrylate-co-ethyl acrylate), polyacrylonitrile, poly(vinyl-chloride co-vinylacetate), poly(1-vinylpyrrolidone-co-vinylacetate), polyvinylpyrrolidone, polyacrylate, polymethacrylate, polyurethane, polyvinylether, an acrylonitrile-butadiene rubber, a styrene-butadiene rubber, an acrylonitrile-butadiene-styrene rubber, a sulfonated styrene/ethylene-butylene triblock copolymer, a polymer derived from at least one acrylate monomer selected from ethoxylated neopentyl glycol diacrylate, ethoxylated bisphenol A diacrylate, ethoxylated aliphatic urethane acrylate, ethoxylated alkylphenol acrylate (e.g., ($C_{1-14}$alkyl_phenol) acrylate, and alkylacrylate (e.g., ($C_{1-6}$alkyl) acrylate, polyvinyl alcohol, polyamide, an epoxy resin, and an acryl-based resin, but is not limited thereto. Any polymer or combination thereof suitable for manufacturing a porous organic layer and available in the art may be used.

The insulating GDL may be in a form of a woven fabric or a non-woven fabric. For example, the insulating GDL may be a polyethylene-based non-woven fabric, a polypropylene-based non-woven fabric, or a polyethylene terephthalate-based non-woven fabric.

The insulating GDL may have a thickness of 500 μm or less. The thinner the insulating GDL is, the greater the specific energy (energy per unit weight) and energy density the metal-air battery may have. For example, the insulating GDL may have a thickness in a range of about 1 μm to about 500 μm, about 1 μm to about 450 μm, about 1 μm to about 400 μm, about 1 μm to about 350 μm, or about 1 μm to about 300 μm, or about 1 μm to about 500 μm, about 2 μm to about 450 μm, about 5 μm to about 400 μm, about 10 μm to about 350 μm, or about 50 μm to about 300 μm.

The insulating GDL may have a density of about 0.14 g/m$^2$ or less. Since the insulating GDL is porous as it includes the plurality of pores, the insulating GDL may have a density of 0.14 g/cm$^3$ or less. For example, the insulating GDL may have a density in a range of about 0.01 g/cm$^3$ to about 0.14 g/cm$^3$, about 0.05 g/cm$^3$ to about 0.14 g/cm$^3$, or about 0.1 g/cm$^3$ to about 0.14 g/cm$^3$.

As used herein with respect to the gas diffusion layer, "insulating" refers to the electrical properties of the gas diffusion layer. The insulating gas diffusion layer may have any suitable electrical resistivity. The electrical resistivity of the insulating gas diffusion layer may be about 1 ohm-meter to about 10$^{25}$ ohm-meters, about 10 ohm-meters to about 10$^{24}$ ohm-meters, about 100 ohm-meters to about 10$^{21}$ ohm-meters, or about 10$^3$ ohm-meters to about 10$^{21}$ ohm-meters.

A commercially available conductive GDL (e.g., SGL Technologies GmbH 35BA carbon paper), may have a density of about 0.18 g/cm$^3$ or greater. Since the insulating GDL used herein has a lower density than that of the conductive GDL, e.g., carbon paper, the metal-air battery including the insulating GDL may have an improved specific energy (energy per unit weight) and energy density.

Figure 1B:
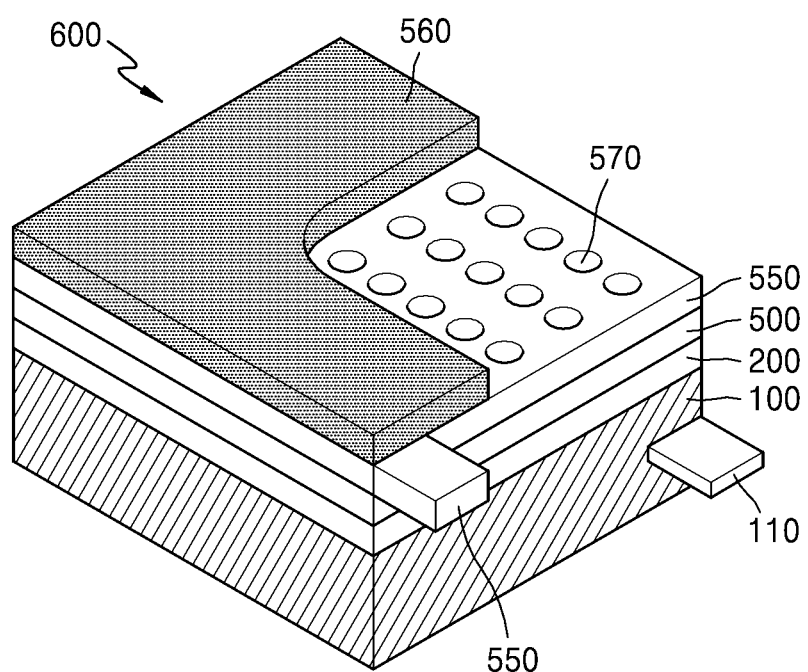

Referring to FIGS. 1A and 1B, a metal-air battery 600 according to an embodiment includes a negative electrode 100, a positive electrode 500, an ion conducting membrane 200 disposed between the negative electrode 100 and the positive electrode 500, a positive electrode current collector 550 on a surface of the positive electrode 500 and including a plurality of pores 570, and an insulating gas diffusion layer (GDL) 560 on a surface of the positive electrode current collector 550. In addition, a negative current collector 110 is placed to contact the negative electrode 100. The positive electrode current collector is between the insulating gas diffusion layer and the positive electrode, and thus the positive electrode current collector 550 is on a surface of the positive electrode 500 which is opposite the ion conducting membrane 200. Also, the insulating gas diffusion layer 560 is on a surface of the positive electrode current collector 550 which is opposite the positive electrode 500.

The insulating GDL 560 allows air, which includes oxygen and is supplied from the outside, to pass through the insulating GDL 560 and reach the positive electrode 500 via the positive electrode current collector 550 including the plurality of pores 570.

Figure 2:
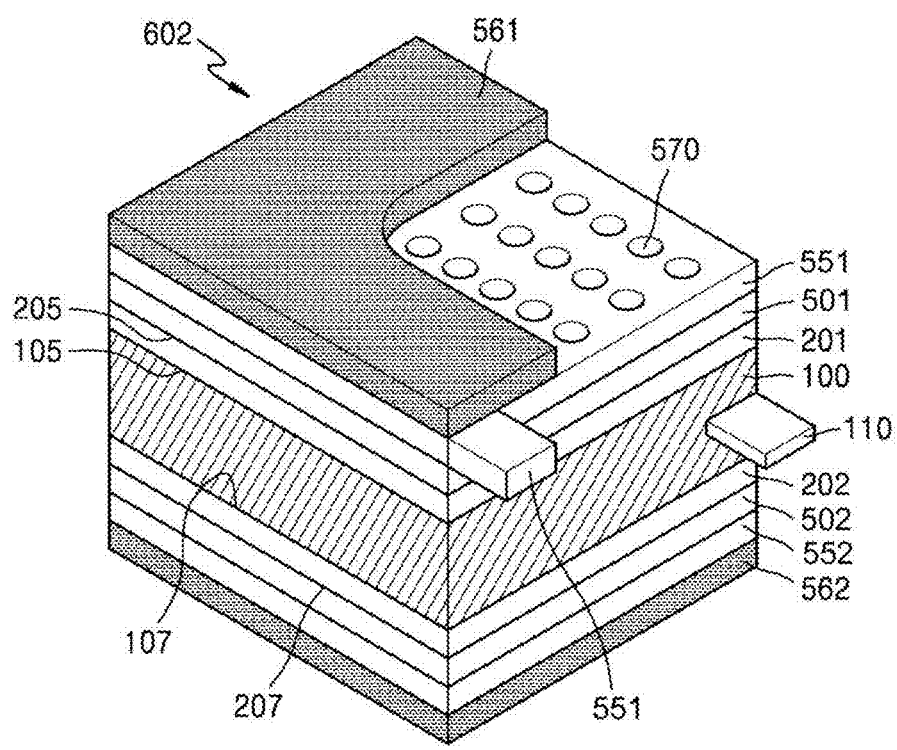
FIG. 2 is a schematic view illustrating a structure of another embodiment of a metal-air battery.

Referring to FIG. 2 with regard to the metal-air battery 602 according to an embodiment, the negative electrode 100 includes first and second opposite surfaces 105 and 107, respectively, the first and second ion conducting membranes 201 and 202, respectively, are placed on each of the first and second opposite surfaces 105 and 107, respectively, and first and second positive electrodes 501 and 502, respectively, are placed on each of the first and second opposite surfaces 205 and 207, respectively, of the first and second ion conducting membranes 201 and 202, respectively. In addition, first and second positive electrode current collectors 551 and 552 including the plurality of pores 570 and the first and second insulating GDLs 561 and 562, respectively, are sequentially placed on the first and second positive electrodes 501 and 502, respectively.

The metal-air battery 602 of FIG. 2 has a bicell structure in which two positive electrodes, first and second positive electrodes 501 and 502, are respectively placed on the first and second opposite surfaces 105 and 107 of the single negative electrode 100. As bicell-structured metal-air battery 602 includes the first and second positive electrode current collectors 551 and 552 including the plurality of pores 570 and the first and second insulating GDLs 561 and 562, the gas supply from the outside may be facilitated.

Figure 3:
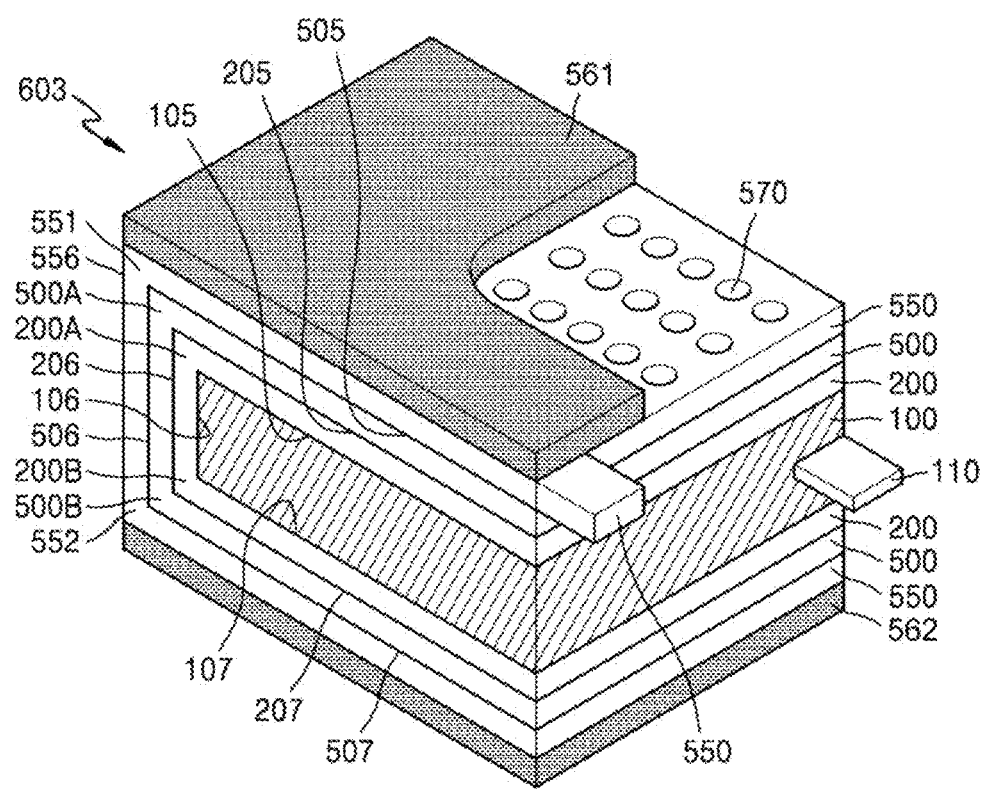
FIG. 3 is a schematic view illustrating a structure of another embodiment of a metal-air battery.

Referring to FIG. 3 with regard to the metal-air battery 603 according to another exemplary embodiment, the negative electrode 100 includes the opposite surfaces 105 and 107, and the ion conducting membrane 200 including one or more folded portions 200A and 200B to surround the negative electrode 100 so as to be positioned over each of the first and second opposite surfaces 105 and 107 of the negative electrode 100. The positive electrode 500 including one or more folded portions 500A and 500B that are folded in the same direction as a bending direction of the ion conducting membrane 200 to surround the ion conducting membrane 200 so as to be positioned on each of the first and second opposite surfaces 205 and 207 of the ion conducting membrane 200. The positive electrode current collector 550 including one or more folded portions, e.g., first and second folded portions 550A and 550B, that are folded in the same direction as a bending direction of the positive electrode 500 to surround the positive electrode 500 so as to be positioned on each of first and second opposite surfaces 505 and 507, respectively, of the positive electrode 500. In addition, the insulating GDL 560 is positioned on each of the opposite sites of the positive electrode current collector 550.

The metal-air battery 603 of FIG. 3 has a shield structure in which the positive electrode 500 including one or more folded portions, e.g., first and second folded portions 500A and 500B, respectively surround the first and second opposite surfaces 105 and 107 of the negative electrode 100. As the shield-structured metal-air battery 603 includes the positive electrode current collector 550 including the plurality of pores 570 and the first and second insulating GDLs 560 and 562, respectively, the gas supply from the outside may be facilitated.

Regarding the metal-air battery 603 of FIG. 3, the positive electrode current collector 550 includes a side surface 556 in a same direction as a side surface 106 that contacts the surface 105 of the negative electrode 100. Thus, the side surface 556 of the positive electrode current collector 550 is directly exposed to the outside with an absence of the insulating GDL 560. Accordingly, air may be directly delivered to the positive electrode 500 through the plurality of pores 570 in the side surface 556 of the positive electrode current collector 550, thereby increasing an oxygen concentration of surfaces of the positive electrode 500 and improving a discharge capacity of the metal-air battery 603.

In addition, the structure of the metal-air battery 603 of FIG. 3 corresponds to one-half folded structure of the metal-air battery 600 of FIG. 1A. That is, a battery area of the metal-air battery 603 of FIG. 3 is one-half of that of the metal-air battery 600 of FIG. 1A. In this regard, the air flow path for air supplied from the side surface of each of the first and second insulating GDLs 561 and 562 may also be one-half of that of the metal-air battery 600 of FIG. 1A, thereby increasing the oxygen concentration in the midpoint of each of the first and second insulating GDLs 561 and 562 to improve the discharge capacity of the metal-air battery 603 of FIG. 3.

Figure 4:
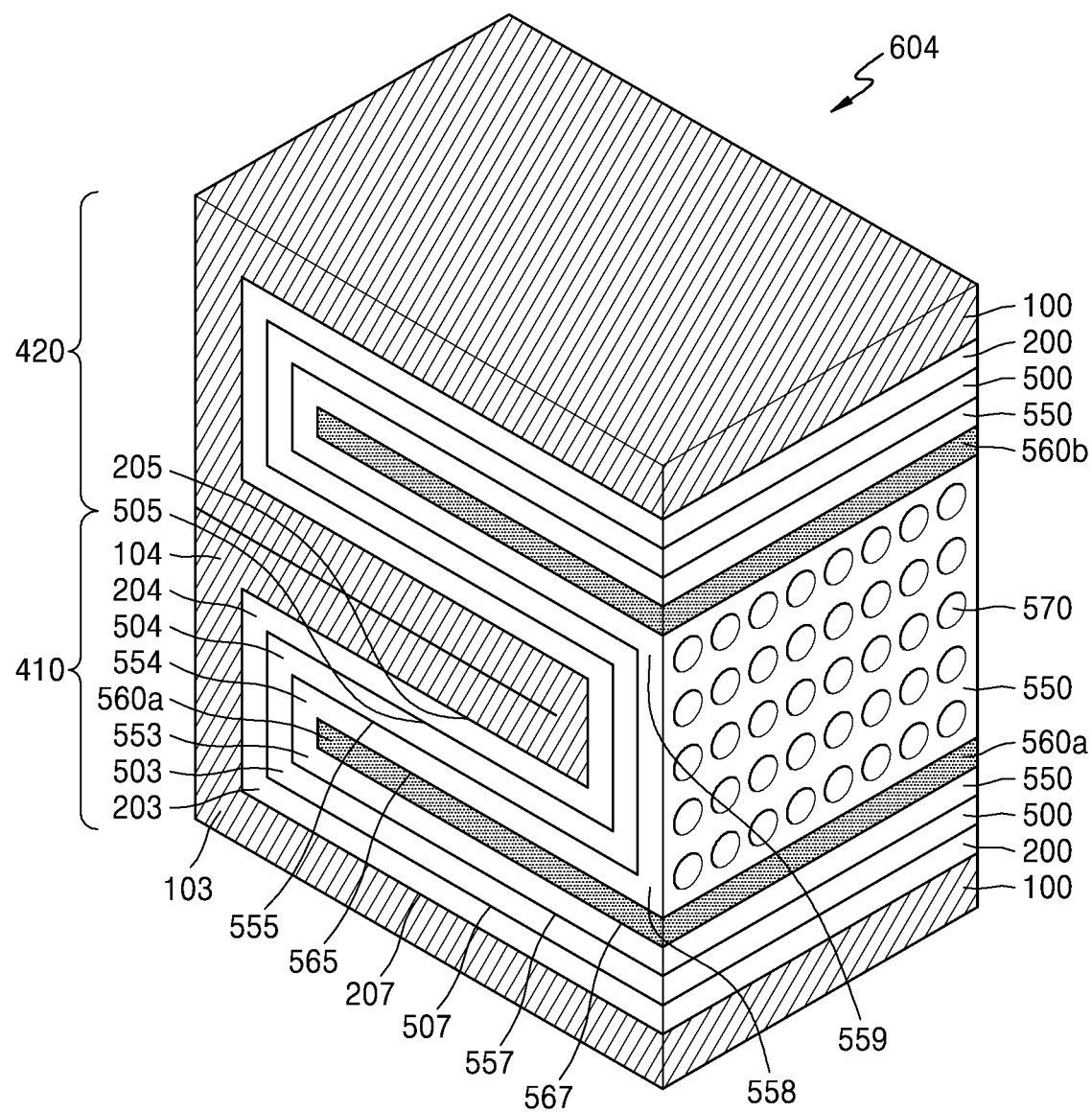
FIG. 4 is a schematic view illustrating a structure of another embodiment of a metal-air battery.

Referring to FIG. 4 with regard the metal-air battery 604 according to another embodiment, a first insulating GDL 560a includes first and second opposite surfaces 565 and 567, respectively, and the positive electrode current collector 550 includes one or more folded portions, such as first and second folded portions 553 and 554, respectively, which surround the first insulating GDL 560a so as to be positioned over each of the first and second opposite surfaces 565 and 567, respectively, of the first insulating GDL 560a. In addition, the positive electrode 500, which includes one or more folded portions, such as first and second folded portions 503 and 504, respectively, which are folded in a same direction as a bending direction of the positive electrode current collector 550, which surrounds the positive electrode current collector 550 so as to be positioned over each of the first and second opposite surfaces 555 and 557, respectively, of the positive electrode current collector 550. The ion conducting membrane 200 which includes one or more folded portions, such as first and second folded portions 203 and 204, respectively, which are folded in a same direction as a bending direction of the positive electrode 500 to surround the positive electrode 500 so as to be positioned over each of the first and second opposite surfaces 505 and 507, respectively, of the positive electrode 500. In addition, the negative electrode 100 includes one or more folded portions, such as first and second folded portions 103 and 104, respectively, which are folded in a same direction as a bending direction of the ion conducting membrane 200 to surround the ion conducting membrane 200 so as to be positioned over each of the first and second opposite surfaces 205 and 207, respectively, of the ion conducting membrane 200. The metal-air battery 604 of FIG. 4 comprises a plurality of folded units, such as folded units 410 and 420.

The metal-air battery 604 of FIG. 4 includes a plurality of insulating GDLs, such as first and second insulating GDLs 560a and 560b, respectively. The positive electrode current collector 550, the positive electrode 500, the ion conducting membrane 200, and the negative electrode 100, each of which includes one or more folded portions folded in a same direction, surrounds each of the plurality of the first and second insulating GDLs 560a and 560b so as to be repeatedly positioned over each of the opposite surfaces of the insulating GDLs.

In addition, the metal-air battery 604 of FIG. 4 includes the positive electrode current collector 550, which includes one or more folded portions 558 and 559 that contact the first and second insulating GDLs 560a and 560b, between the first and second insulating GDLs 560a and 560b adjacent to each other. In addition, the positive electrode 500, the ion conducting membrane 200, and the negative electrode 100 are folded in a same direction as a bending direction of the positive electrode current collector 550. In this regard, as the negative electrode 100 is folded more than once, a point of the surface of the negative electrode 100 is superimposed on the other point of the same surface and the points are in contact with each other.

Referring to FIG. 4, in the metal-air battery 604, once a large-scaled sheet, wherein the negative electrode 100, the ion conducting membrane 200, the positive electrode 500, and the positive electrode current collector 550 including the plurality of pores 570 are sequentially stacked, is prepared, the large-scaled sheet may be repeatedly folded to be positioned between the plurality of the insulating GDLs, such as insulating GDLs 560a and 560b. Thus, a three-dimensional metal-air battery may be easily prepared via a simple manufacturing process.

Although not illustrated in FIGS. 1A to 4, the metal-air battery according to another embodiment may be sealed with a packaging material, except a portion of the insulating GDL and/or the porous positive current collector that are exposed to the outside.

Figure 5:
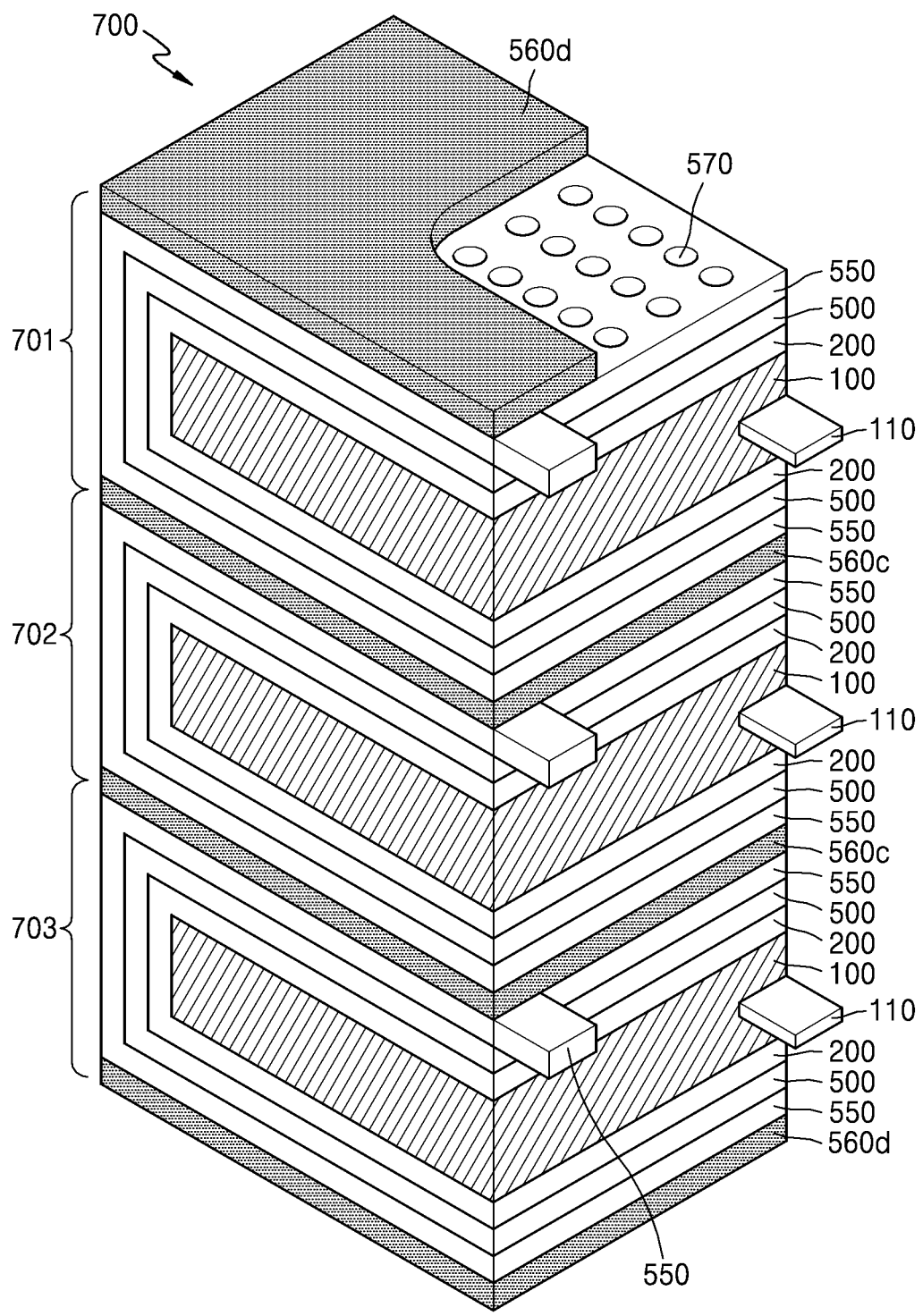
FIG. 5 is a schematic view illustrating a structure of yet another embodiment of a metal-air battery.

Referring to FIG. 5, a metal-air battery module 700 according to an exemplary embodiment includes a plurality of the metal-air cells, e.g., first, second, and third metal-air cells 510, 520, and 530, respectively, which are stacked on one another as described above in connection with FIG. 3, and at least one inner insulating GDL 560c, which is disposed between opposing surfaces of the adjacent metal-air cells. Also disclosed are outer insulating GDLs 560d, which are disclosed on the outer surfaces of the outermost metal-air cells.

The metal-air battery module may comprise: a top cell 701; and at least one middle cell 702 disposed between the top cell and a bottom cell 703, wherein the top cell and the bottom cell each comprise a negative electrode, a positive electrode, an ion conducting membrane disposed between the negative electrode and the positive electrode, a positive electrode current collector disposed on a surface of the positive electrode and comprising a plurality of pores, and an insulating gas diffusion layer disposed on an outer surface of the positive electrode current collector, and wherein each middle cell comprises a negative electrode, a positive electrode, an ion conducting membrane disposed between the negative electrode and the positive electrode, a positive electrode current collector disposed on a surface of the positive electrode and comprising a plurality of pores, a first insulating gas diffusion layer disposed on an upper surface of the positive electrode current collector, and a second insulating gas diffusion layer disposed on an lower surface of the positive electrode current collector.

When the insulating GDL is positioned between adjacent metal-air cells, which are stacked on one another, air may be supplied to the plurality of the metal-air cells at the same time, thereby improving the energy efficiency of the metal-air battery module 700. In addition, as the number of the metal-air cells stacked on one another is increased, almost one insulating GDL is required for each of the metal-air cells, thereby improving the energy density of the resulting metal-air battery module 700.

In the metal-air battery module 700, a terminal of the positive electrode current collector 550 and a terminal of the negative current collector 110, each of which belongs to a metal-air cell included in the metal-air battery module 700, may be connected in series, in parallel, or in a mixture of parallel and serial.

The structure of the metal-air battery module 700 of FIG. 5 is based on the structure of the metal-air battery 600 of FIG. 3, but is not limited thereto. Thus, the metal-air battery module 700 of FIG. 5 may be prepared in the same manner as described above using various configurations of the metal-air battery 600.

Although not illustrated in FIG. 5, the metal-air battery module 700 may be sealed with a packaging material, except a portion of the insulating GDL 560 and/or the porous electrode current collector 550 to which oxygen is supplied.

Hereinafter, the negative electrode 100, the positive electrode 500, and the ion conducting membrane 200 included in the metal-air battery will be described in further detail.

Referring to FIGS. 1A to 5, the negative electrode 100 included in the metal-air battery may be a reactive metal negative electrode. The reactive metal may include an alkali metal (e.g., lithium, sodium, or potassium), an alkaline earth metal (e.g., calcium, magnesium, or barium), a transition metal (e.g., zinc), or an alloy thereof.

In particular, the reactive metal may include at least one selected from lithium and a lithium alloy.

A lithium metal foil may be used as the reactive metal without an additional any preparation process. In this case, the volume and weight occupied by the current collector may be reduced, and accordingly, the specific energy and energy density of a lithium-air battery may be improved. Alternatively, the lithium metal foil may be placed on a conductive substrate that serves as a current collector. Alternatively, the lithium metal foil may be integrated with a current collector to provide a monolithic body. The current collector may include at least one material selected from stainless steel, copper, nickel, iron, and cobalt, but is not limited thereto. Any suitable metallic substrate available in the art and having suitable conductivity may be used.

The reactive metal may be an alloy of a lithium metal and a negative electrode active material. The negative electrode active material may be a metal alloyable with lithium. Examples of the metal alloyable with lithium include Si, Sn, Al, Ge, Pb, Bi, Sb, a Si—Y' alloy (wherein Y' may be an alkali metal, an alkali earth metal, a Group 13 element, a Group 14 element, a transition metal, a rare-earth element, or a combination thereof, except for Si), and a Sn—Y" alloy (wherein Y" may be an alkali metal, an alkali earth metal, a Group 13 element, a Group 14 element, a transition metal, a rare-earth element, or a combination thereof, except for Sn). Examples of the element Y' and Y" each independently include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof. For example, a reactive metal may be a lithium aluminum alloy, a lithium silicon alloy, a lithium tin alloy, a lithium silver alloy, or a lithium lead alloy.

The reactive metal of the negative electrode 100 may have a thickness of about 10 μm or greater. The reactive metal of the negative electrode 100 may have a thickness in a range of about 10 μm to about 20 μm, about 20 μm to about 60 μm, about 60 μm to about 100 μm, about 100 μm to about 200 μm, about 200 μm to about 600 μm, about 600 μm to about 1,000 μm, about 1 mm to about 6 mm, about 6 mm to about 10 mm, about 10 mm to about 60 mm, about 60 mm to about 100 mm, and about 100 mm to about 600 mm.

Referring to FIGS. 1A to 5, the metal-air battery may include a conductive material as the positive electrode 500 so that oxygen may be a positive electrode active material. The conductive material may be a porous material. Therefore, any suitable material having suitable porosity and suitable conductivity may be used as the positive electrode active material without limitation. For example, a carbon-based material having porosity may be used as the positive electrode active material. Examples of the carbon-based material include a carbon black-like material, a graphite-like material, a graphene-like material, an activated carbon-like material, and a carbon fiber-like material.

In addition, the positive electrode active material may be a metallic-conductive material, such as metal fiber or a metal mesh. In addition, the positive electrode active material may comprise a metallic powder, such as copper, silver, nickel, or aluminum powder. In addition, the positive electrode active material may comprise an organic conductive material, such as a polyphenylene derivative. Such a conductive material may be used alone or in combination with other materials.

The positive electrode 500 may include a catalyst for facilitating oxidation/reduction of oxygen. Examples of the catalyst include: a precious metal-based catalyst, such as platinum (Pt), gold (Au), silver (Ag), palladium (Pd), ruthenium (Ru), rhodium (Rh), and osmium (Os); an oxide-based catalyst, such as manganese oxide, iron oxide, cobalt oxide, and nickel oxide; or an organic metal-based catalyst, such as cobalt phthalocyanine, but are not limited thereto. Any material suitable as a catalyst for oxidation/reduction of oxygen and available in the art may be used.

In addition, the catalyst may be supported on a support. The support may include an oxide, zeolite, clay mineral, or a carbon. The oxide may include at least one oxide of alumina, silica, zirconium oxide, and titanium dioxide. The oxide may be an oxide including at least one metal selected from cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), and tungsten (W). The carbon may include, but is not limited to, a carbon black-like material, such as Ketchen black, acetylene black, channel black, or lamp black; a graphite-like material, such as natural graphite, artificial graphite, or expanded graphite; an activated carbon-like material, or a carbon fiber-like material. Any material suitable for use as a support and available in the art may be used.

The positive electrode 500 may further include a binder, and the binder may include a thermoplastic resin or a thermocurable resin. Examples of the binder may include, but are not limited to, polyethylene, polypropylene, polytetrafluoro ethylene (PTFE), polyvinylidene fluoride (PVDF), a styrene-butadiene rubber, a tetrafluoroethylene-perfluoroalkylvinylether copolymer, a vinylidene fluoride-hexafluoropropylene copolymer a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluorotehylene copolymer, a vinylidene fluoride-hexafluoropropylene-tetrafluoroethylene copolymer, a vinylidene fluoride-perfluoromethylvinylether-tetrafluoroethylene copolymer, and an ethylene-acrylic acid copolymer. The binder may be used alone or in combination with other materials. Any material suitable for use as the binder and available in the art may be used.

The positive electrode 500 may further include an ion conducting polymer electrolyte. The ion conducting polymer electrolyte may be prepared by doping lithium with a polymer, e.g., at least one selected from polyethylene oxide (PEO), polyvinyl alcohol (PVA), polyvinylpyrrolidone (PVP), and polysulfone, or a combination thereof. For example, the ion conducting polymer solid electrolyte may be polyethylene oxide doped with a lithium salt. Such a doped lithium salt may be same as that used for the above-described ion conducting polymer electrolyte.

The positive electrode 500 may be prepared as follows. For example, a catalyst for oxidation/reduction of oxygen, a conductive material, and a binder may be mixed together, and then, an appropriate solvent may be added thereto to prepare a positive electrode slurry. Afterwards, the positive electrode slurry may be coated and dried over a surface of a current collector, or optionally the positive electrode slurry may be press-molded on a current collector to improve an electrode density. In addition, the positive electrode 500 may optionally include a lithium oxide. In addition, use of the catalyst for oxidation/reduction of oxygen may be optionally omitted.

Referring to FIGS. 1A to 5, the ion conducting membrane 200 may be an active metal ion conducting membrane having conductivity of active metal ions.

The ion conducting membrane 200 may be an ion conducting solid membrane, which may be substantially impermeable and has ion conductivity of active metals. In addition, the ion conducting membrane 200 may be chemically compatible with an external environment including oxygen or moisture or with a positive electrode environment.

The ion conducting membrane 200 may have a thickness of about 10 μm or more. The active metal ion conducting membrane architecture 200 may have a thickness in a range of about 10 μm to about 20 μm, about 20 μm to about 60 μm, about 60 μm to about 100 μm, about 100 μm to about 200 μm, about 200 μm to about 600 μm, about 600 μm to about 1,000 μm, about 1 mm to about 6 mm, about 6 mm to about 10 mm, about 10 mm to about 60 mm, about 60 mm to about 100 mm, or about 100 mm to about 600 mm.

The ion conducting membrane 200 may be a gas and moisture barrier membrane. Since a gas, such as oxygen, and moisture may be blocked by the active metal ion conducting membrane 200, the negative electrode 100 enclosed in a housing that is impermeable and includes the ion conducting membrane 200 may be protected from deterioration by oxygen or moisture.

Although not illustrated, to isolate the negative electrode 100 from the positive electrode 500, the ion conducting membrane 200 encloses the negative electrode 100, thereby forming a housing that is substantially impermeable and includes an internal region hermetically sealed from an external region. Thus, the negative electrode 100 is isolated in the housing, but transportation of active metal ions into and out of the housing is possible.

The impermeable housing may block transportation of external liquid and/or gas components, such as moisture and oxygen, except for active metal ions, from an external environment to suppress side reactions between such external components and the active metal of the negative electrode 100, thereby improving the lifetime characteristics of the metal-air battery. In addition, when a volatile component is present in the housing that is impermeable and encloses the negative electrode 100, the housing may prevent volatilization of the volatile component, thereby preventing loss of the volatile component. Since the housing is formed only with the ion conducting membrane 200, the metal-air battery may have a simplified structure.

Alternatively, although not illustrated, the metal-air battery may further include a seal structure that interfaces with the ion conducting membrane 200 to enclose the negative electrode 100. The seal structure may form a housing that is substantially impermeable and includes an internal region hermetically sealed from an external region, thereby isolating the negative electrode 100 from the positive electrode 500.

Although the negative electrode 100 is isolated in the housing including the seal structure, transportation of active metal ions into and out of the housing is possible. The impermeable housing including the seal structure may include an empty space.

The housing including the seal structure may be substantially impermeable to external liquid and/or gas components, such as moisture and oxygen. The seal structure may include a single material having chemical stability, flexibility, and substantial impermeability, or may include a mixture of such materials.

The seal structure may include a polymer having chemical stability, flexibility, and the ability to block gas and moisture.

The polymer having ability to block gas and moisture may be, for example, polysilicone, poly-ethylene-vinyl alcohol (EVOH), polyvinylidene chloride (PVDC), high-density ethylene (HDPE), polypropylene (PP), polyvinyl chloride (PVC), polytetrafluoroethylene (PTFE), or polyvinylidene fluoride (PVDF), but is not limited thereto. Any material that has the ability to block gas and moisture and is available in the art for use as a seal structure may be used.

The ion conducting membrane 200 may be a composite membrane consisting of at least two components. The composite membrane may have a thickness of about 10 μm or greater. For example, the composite membrane may have a thickness in a range of about 10 μm to about 100 μm, or about 100 μm to about 600 μm.

For example, the ion conducting membrane 200 may be a composite membrane including an organic film having a plurality of pores and an ion-conductive polymer electrolyte formed in the plurality of pores of the organic film.

The organic film including a plurality of pores may be a porous organic film in which a plurality of pores are irregularly arranged. The organic film including a plurality of pores may be a flexible polymer-based separator.

The porous organic film may be formed of, for example, a polymer nonwoven fabric, such as polypropylene-based non-woven fabric, polyimide-based nonwoven fabric, or polyphenylene sulfide-based nonwoven fabric; or a porous film of an olefin-based resin, such as polybutene or polyvinyl chloride, but is not limited thereto. Any material available in the art for a porous organic film may be used. For example, the porous organic film may include a polymer that is the same as the polymer for an organic film having a plurality of through holes as will be described later.

The ion-conductive polymer electrolyte may be included in the plurality of pores of the porous organic film. For example, the porous organic film including the plurality of pores may be impregnated with the ion-conductive polymer electrolyte.

A flow path formed by interconnection of the plurality of pores that are irregularly arranged may be impregnated with the ion-conductive polymer electrolyte so that opposite surfaces of the organic film are exposed to thereby provide a migration path of active metal ions.

The ion-conductive polymer electrolyte disposed in pores of the porous organic film may include a polymer, e.g., at least one selected from polyethylene oxide (PEO), polyvinyl alcohol (PVA), polyvinylpyrrolidone (PVP), and polysulfone, or a combination thereof, but is not limited thereto. Any suitable material available in the art for use as an ion-conductive polymer electrolyte may be used.

The ion-conductive polymer solid electrolyte on the organic layer including the plurality of pores may be, for example, polyethylene oxide (PEO) doped with a lithium salt. Example of the lithium salt include $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, and $LiAlCl_4$.

For example, the ion conducting membrane 200 may be a composite membrane including an organic film having a plurality of through holes and an ion-conductive inorganic particle formed in the plurality of through holes. The term "through hole" used herein refers to a hole formed to pass through opposite surfaces of the organic layer.

The ion-conductive inorganic particle formed in the plurality of through holes is exposed to both of the opposite surfaces of the organic layer, and accordingly, provides a migration path of active metal ions.

The ion conducting membrane 200 may include an ion-conductive domain and a non-ion-conductive domain. The ion-conductive domain and the non-ion-conductive domain may be disposed according to a membrane thickness direction (i.e., a Y-axis direction) to contact each other, thereby forming a bi-continuous structure. The ion-conductive domain may include an ion-conductive inorganic particle while the non-ion-conductive domain may include a polymer. The ion-conductive inorganic particle may have a single-particle state without grain boundaries. The active metal ion conducting membrane architecture including the ion-conductive inorganic particles exposed to the surfaces of the organic film may be a composite membrane having ionic conductivity with good flexibility and improved mechanical strength, and which thus may be processable as desired.

The organic film having a plurality of pores or having a plurality of through holes may include a polymer that has the ability to block gas and moisture.

Since the organic layer included in the ion conducting membrane 200 blocks gas and moisture, the ion conducting membrane 200 may protect the negative electrode 100. Therefore, the ion conducting membrane 200 may serve as a protective membrane.

The polymer having the ability to block gas and moisture may be a same polymer as the one used for the insulating GDL, but is not limited thereto. Any polymer having barrier characteristics of blocking gas and moisture and available in the art may be used.

The ion-conductive inorganic particle may be at least one selected from a glassy or amorphous metal ion conductor, a ceramic active metal ion conductor, and a glassy and ceramic active metal ion conductor. The ion-conductive inorganic particle may also block gas and moisture.

For example, the ion-conductive inorganic particle may include at least one selected from $BaTiO_3$, $Pb(Zr,Ti)O_3$ (PZT), $Pb_{1-x}La_xZr_{1-y}Ti_yO_3$(PLZT)($0 \leq x \leq 1$, $0 \leq y < 1$), $PB(Mg_3Nb_{2/3})O_3-PbTiO_3$(PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z(PO_4)_3$, where $0<x<2$, $0<y<1$, and $0<z<3$), $Li_{1+x+y}(Al, Ga)_x(Ti, Ge)_{2-x}Si_yP_{3-y}O_{12}$ (where $0 \leq x \leq 1$ and $0 \leq y \leq 1$), lithium lanthanum titanate ($Li_xLa_yTiO_3$, where $0<x<2$ and $0<y<3$), lithium germanium thiophosphate ($LixGeyPzSw$, where $0<x<4$, $0<y<1$, $0<z<1$, and $0<w<5$), lithium nitride-based glass ($Li_xN_y$, where $0<x<4$ and $0<y<2$), $SiS_2(Li_xSi_yS_z$, where $0<x<3$, $0<y<2$, and $0<z<4$), $P_2S_5$-based glass ($Li_xP_yS_z$, where $0<x<3$, $0<y<3$, and $0<z<7$), $Li_2O$, $LiF$, $LiOH$, $Li_2CO_3$, $LiAlO_2$, $Li_2O-Al_2O_3-SiO_2-P_2O_5-TiO_2-GeO_2$-based ceramics, Garnet-based ceramics ($Li_{3+x}La_3M_2O_{12}$, where M is Te, Nb, or Zr), or any combination thereof. However, examples of the ion-conductive inorganic particles are not limited thereto. Any suitable material available in the art for ion-conductive inorganic particles may be used.

The ion-conductive inorganic particle has no grain boundary as described above. Accordingly, a composite membrane including such ion-conductive inorganic particles may have a low-resistance conduction path of active metal ions. This may facilitate conduction and migration of active metal ions, and consequentially significantly improve the conductivity of active metal ions and the transport rate of lithium ions. The composite membrane may have good flexibility and improved mechanical strength compared to a membrane including inorganic particles only.

It may be confirmed by using a scanning electron microscope that (SEM) the ion-conductive inorganic particle is in a single-particle state without grain boundaries.

The ion-conductive inorganic particle may have an average particle diameter of about 10 μm to about 300 μm, e.g., about 90 μm to about 125 μm. When the average particle diameter of the ion-conductive inorganic particle is within the ranges above, it may be easy to form the active metal ion conducting membrane 200 as a composite membrane including ion-conductive inorganic particles having a single-particle state without grain boundary, for example, by polishing.

The ion-conductive inorganic particle may have a uniform particle size, and accordingly, the particle size uniform may be maintained uniform in the composite membrane. For example, the ion-conductive inorganic particle may have a D50 of about 110 μm to about 130 μm, a D90 of about 180 μm to about 200 μm, and a D10 of about 60 μm to about 80 μm. The terms "D50", "D10", and "D90" used herein refer to a particle diameter of 50 volume %, 10 volume %, and 90 volume %, respectively, in a cumulative distribution curve of particle sizes.

The ion conducting membrane 200 may have a single-layer structure or a multi-layer structure.

When the ion conducting membrane 200 is a composite membrane having a single-layer structure, the composite membrane may include an ion-conductive separator having a plurality of pores and an ion-conductive polymer electrolyte formed in the pores of the ion-conductive polymer separator, or may include an organic film having a plurality of through holes and an ion-conductive inorganic particle present in the through holes of the organic layer. These composite membranes may be prepared at a lower cost than conventional ceramic material membranes. When the composite membrane is used, a metal-air battery with a large area, a thin film design, and a less weight may be manufactured according to a simple manufacturing process. In addition, a metal-air battery having improved lifetime may be manufactured using such a composite membrane. For example, the composite membrane having a single-layer structure may have a thickness in a range of about 10 μm to about 100 μm, or about 100 μm to about 300 μm.

When the ion conducting membrane 200 is a composite membrane having a multi-layer structure, the ion conducting membrane 200 may have a multi-layer structure in which a composite layer with the ability to block gas and moisture and a polymer electrolyte layer are stacked one another. The further inclusion of the polymer electrolyte membrane that is chemically compatible with both a negative electrode environment and the composite layer between the composite film and the negative electrode 100 may improve the stability of the negative electrode 100 and the composite layer. The composite layer may substantially serve as a protective membrane for the negative electrode 100.

The polymer electrolyte membrane disposed between the composite film and the negative electrode 100 may have a thickness of about 1 μm or greater. For example, the polymer electrolyte membrane may have a thickness in a range of about 1 μm to about 50 μm, or about 100 μm to about 300 μm. The polymer electrolyte membrane may be a polyethylene oxide doped with a lithium salt. The doped lithium salt may be the same as the one used for the ion-conductive polymer electrolyte described above.

In addition, a porous membrane may be further disposed between the composite film and the polymer electrolyte membrane or between the polymer electrolyte membrane and the negative electrode.

Any suitable membrane including pores and having suitable mechanical and heat-resistance characteristics may be used as the porous membrane. Examples of the porous membrane include, but are not limited to, sheets or nonwoven fabric made of an olefin-based polymer, which has suitable resistance to chemicals and hydrophobicity; a glass fiber; or a polyethylene. Examples of the olefin-based polymer include polyethylene, polypropylene, or any combination thereof. For example, the porous membrane may have a mixed multiple layer, such as a two-layered structure of polyethylene/polypropylene, a three-layered separator of polyethylene/polypropylene/polyethylene, or a three-layered separator of polypropylene/polyethylene/polypropylene.

The porous membrane may comprise, for example, a polyethylene membrane, a polypropylene membrane, or a combination thereof. The porous membrane may have a pore diameter in a range of about 0.01 μm to about 10 μm, and a thickness of about 10 μm or greater. For example, the porous membrane may have a thickness in a range of about 10 μm to about 100 μm, or about 100 μm to about 300 μm. For example, porous membrane may have a thickness in a range of about 10 μm to about 50 μm.

In addition, the porous layer/membrane may include an electrolyte solution containing a lithium salt and an organic solvent. The porous layer/membrane including the electrolyte solution may serve as an electrolytic membrane.

An amount of the lithium salt contained in the electrolyte solution may be in a range of about 0.01 molar (M) to about 5 M, for example, about 0.2 M to about 2 M. When the amount of the lithium salt is within the ranges above, the composite layer may have excellent conductivity.

The lithium salt is dissolved in the organic solvent to serve as a source of lithium ions in a battery. For example, the lithium salt may be at least one selected from $LiPF_6$, $LiBF_4$, $LiSbF_6$, $LiAsF_6$, $LiN(SO_2C_2F_5)_2$, $Li(CF_3SO_2)_2N$ (LiTFSi), $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiF, LiBr, LiCl, LiOH, LiI, $LiB(C_2O_4)_2$(lithium bis (oxalato) borate; LiBOB), and $LiN(SO_2F)_2$(LiFSi).

The active metal ion conducting membrane may further include a metal salt, for example, $AlCl_3$, $MgCl_2$, NaCl, KCl, NaBr, KBr, or $CaCl_2$, in addition to the lithium salt described above.

The organic solvent may be an aprotic solvent.

The aprotic solvent includes, for example, a carbonate-based solvent, an ester-based solvent, an ether-based solvent, a ketone-based solvent, an amine-based solvent, or a phosphine-based solvent.

Examples of the carbonate-based solvent include, but are not limited to, dimethyl carbonate (DMC), diethyl carbonate (DEC), ethyl methyl carbonate (EMC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC).

Examples of the ester-based solvent include, but are not limited to, methyl acetate, ethyl acetate, n-propyl acetate, dimethyl acetate, methyl propionate, ethyl propionate, γ-butyrolactone, decanolide, valerolactone, mevalonolactone, and caprolactone.

Examples of the ether-based solvent include, but are not limited to, dibutyl ether, tetraglyme, diglyme, dimethoxyethane, 2-methyl tetrahydrofuran, and tetrahydrofuran. Examples of the ketone-based solvent include cyclohexanone.

Examples of the amine-based solvent include, but are not limited to, triethylamine and triphenylamine. Examples of the phosphate-based solvent include triethylphosphine. However, examples of the aprotic solvents are not limited thereto, and any aprotic solvent available in the art may be used.

Furthermore, examples of the aprotic solvent are include nitriles, such as R—CN (where R is a linear, branched, or cyclic $C_2$-$C_{30}$ hydrocarbon group that includes a double bond, an aromatic ring, or an ether bond); amides such as dimethylformamide; dioxolanes such as 1,3-dioxolane.

The solvent may be used alone or in a combination of at least one thereof. In the latter case, a mixing ratio may be appropriately adjusted according to the battery performance.

In addition, the porous membrane may include an ionic liquid.

The ionic liquid may include a compound consisting of a cation of linear or branched substituted ammonium, imidazolium, pyrrolidinium, and piperidinium; and anion of $PF_6^-$, $BF_4^-$, $CF_3SO_3^-$, $(CF_3SO_2)_2N^-$, $(C_2F_5SO_2)_2N^-$, $(C_2F_5SO_2)_2N^-$, and $(CN)_2N^-$.

Although not illustrated, a solid electrolyte membrane may be further included between the positive electrode 500 and the ion conducting membrane architecture 200. The additional solid electrolyte membrane may be a polymer electrolyte membrane or an inorganic electrolyte membrane.

In addition, although not illustrated, a porous membrane may be further included between the positive electrode 500 and the ion conducting membrane architecture 200. The porous membrane may be same as the porous membrane disposed between the composite membrane and the polymer electrolyte membrane or between the polymer electrolyte membrane and the negative electrode 100.

Although not illustrated, a separator may be further included between the positive electrode 500 and the negative electrode 100. Any composition that can be used in a lithium air battery may be used as the separator. For example, the separator may be a polymer non-woven fabric, such as a polypropylene-based non-woven fabric or a polyphenylene sulfide-based non-woven fabric; or an olefin-based resin porous film, such as polyethylene or polypropylene. The separator may include two or more of the examples in combination.

For example, referring to Table 1, the density (weight per unit volume) of the insulating non-woven fabric is 56% or less of that of the carbon paper, and accordingly, the positive current collector may have high porosity. Thus, the density of the insulating non-woven fabric is significantly reduced compared to that of a pure metal, and accordingly, the insulating non-woven fabric may be prepared as a very thin fabric compared to the carbon paper. For example, the weight per unit volume of pure copper is 8.94 g/cm$^3$, whereas the weight per unit volume of a perforated copper sheet having the porosity of 80% is 1.8 g/cm$^3$.

Referring to Table 1, in the case of a metal-air battery prepared by stacking a non-woven fabric and perforated aluminum, the metal-air battery may have a similar thickness with that of a metal-air battery prepared using carbon paper, and may have a weight that is reduced by 65% of a weight of the metal-air battery prepared using carbon paper.

Therefore, the metal-air battery formed of the non-woven fabric and perforated aluminum may have improved energy density per unit weight compared to that of a metal-air battery formed of a carbon paper.

TABLE 1

|  | Perforated Cu | Perforated Al | Non-woven fabric | Carbon paper (SGL Technologies 35BA) |
|---|---|---|---|---|
| Density [g/cm$^3$] | 1.8 | 0.54 | 0.1 | 0.18 |
| Weight per unit area [g/m$^2$] | — | — | 30 | 54 |
| Area | 10 cm × 10 cm | 10 cm × 10 cm | 10 cm × 10 cm | 10 cm × 10 cm |
| Thickness [μm] | 10 | 10 | 300 | 300 |
| Porosity [%] | 80 | 80 | — | — |
| Weight [g] | 0.18 | 0.054 | 0.3 | 0.54 |

The metal-air battery may be used as either a primary battery or a secondary battery. In addition, the shape of the metal-air battery is not particularly limited. For example, the metal-air battery may be a coin-type battery, a button-type battery, a sheet-type battery, a stacked-type battery, a cylindrical-type battery, a flat-type battery, or a conical-type battery. In addition, the metal-air battery may be applied to a large battery for electrical vehicle use.

The term "air" used in the specification is not limited to air present in the atmosphere, and may also refer to a combination of gas containing oxygen or to pure oxygen gas. Such a broad definition of the term "air" may be applied for any use, e.g., air batteries, air electrode, and the like.

As described above, according to the one or more embodiments of the present disclosure, a metal-air battery may include a porous positive current collector and an insulating gas diffusion layer, and thus may have improved specific energy and energy density.

It shall be understood that the embodiments disclosed herein are to be considered in a descriptive sense only and not for purposes of limitation. Descriptions of features, advantages, or aspects within each exemplary embodiment shall be considered as available for other similar features, advantages, or aspects in other exemplary embodiments.

While one or more embodiments have been described with reference to the figures, it will be understood by those of ordinary skill in the art that various changes in form and details may be made therein without departing from the spirit and scope as defined by the following claims.

What is claimed is:

1. A metal-air battery comprising:
a negative electrode;
a positive electrode;
an ion conducting membrane disposed between the negative electrode and the positive electrode;
a positive electrode current collector disposed on a surface of the positive electrode and comprising a plurality of pores;
a first insulating gas diffusion layer disposed on an upper surface of the positive electrode current collector; and
a second insulating gas diffusion layer disposed on a lower surface of the positive electrode current collector,
wherein the first insulating gas diffusion layer and the second insulating diffusion layer are separated from each other,
wherein the first insulating gas diffusion layer and the second insulating gas diffusion layer are separated from each other, and
wherein the positive electrode current collector comprises a folded portion forming a "U" shape, and the first and the second insulating gas diffusion layers are respectively positioned on each of the opposite surfaces of the folded positive electrode current collector.

2. The metal-air battery of claim 1, wherein the positive electrode current collector is between the insulating gas diffusion layer and the positive electrode, and
wherein the positive electrode current collector comprises therein a gas flow path that penetrates the positive electrode current collector.

3. The metal-air battery of claim 1, wherein the positive electrode current collector comprises at least one selected from copper, stainless steel, aluminum, titanium, gold, platinum, and an alloy thereof.

4. The metal-air battery of claim 1, wherein the positive electrode current collector is at least one selected from a perforated metal, a punched metal, a porous metal, a foamed metal, a mesh metal, a perforated alloy, a punched alloy, a porous alloy, a foamed alloy, and a mesh alloy.

5. The metal-air battery of claim 1, wherein the positive electrode current collector has a density of about 2 grams per cubic centimeter or less.

6. The metal-air battery of claim 1, wherein the first insulating gas diffusion layer is a porous organic membrane.

7. The metal-air battery of claim 1, wherein the first insulating gas diffusion layer comprises at least one polymer selected from a homopolymer, a block copolymer, and a random copolymer.

8. The metal-air battery of claim 7, wherein the at least one polymer comprises at least one polymer selected from polyethylene, polypropylene, polyethylene terephthalate, polyphenylene sulfide, poly(2-vinyl pyridine), polytetrafluoroethylene, a tetrafluoroethylene-hexafluoropropylene copolymer, polychlorotrifluoroethylene, a perfluoroalkoxy copolymer, a fluorinated cyclic ether polymer, polyethyleneoxide diacrylate, polyethyleneoxide dimethacrylate, polypropyleneoxide diacrylate, polypropyleneoxide dimethacrylate, polymethyleneoxide diacrylate, polymethyleneoxide dimethacrylate, poly($C_{1-6}$alkyl)diol diacrylate, poly($C_{1-6}$alkyl)diol dimethacrylate, polydivinylbenzene, polyether, polycarbonate, polyimide, polyester, polyvinylchloride, polyimide, polycarboxylic acid, polysulfonic acid, polyvinyl alcohol, polysulfone, polystyrene, poly(p-phenylene), polyacetylene, poly(p-phenylene vinylene), polyaniline, polypyrrole, polythiophene, poly(2,5-ethylene vinylene), polyacene, poly(naphthalene-2,6-diyl), polyethylene oxide, polypropylene oxide, polyvinylidene fluoride, a copolymer of vinylidene fluoride and hexafluoropropylene, poly(vinyl acetate), poly(vinylbutyral-co-vinyl alcohol-co-vinyl acetate), poly(methyl methacrylate-co-ethyl acrylate), polyacrylonitrile, poly(vinylchloride-co-vinylacetate), poly(1-vinylpyrrolidone-co-vinylacetate), polyvinylpyrrolidone, polyacrylate, polymethacrylate, polyurethane, polyvinylether, an acrylonitrile-butadiene rubber, a styrene-butadiene rubber, an acrylonitrile-butadiene-styrene rubber, a sulfonated styrene/ethylene-butylene triblock copolymer, a polymer derived from at least one acrylate monomer selected from ethoxylated neopentyl glycol diacrylate, ethoxylated bisphenol A diacrylate, ethoxylated aliphatic urethane acrylate, ethoxylated ($C_{1-14}$alkyl phenol acrylate, and ($C_{1-6}$alkyl) acrylate, polyvinyl alcohol, polyamide, an epoxy resin, and an acryl resin.

9. The metal-air battery of claim 1, wherein the first insulating gas diffusion layer is a non-woven fabric.

10. The metal-air battery of claim 1, wherein the first insulating gas diffusion layer has a thickness of about 500 micrometers or less.

11. The metal-air battery of claim 1, wherein the first insulating gas diffusion layer has a density of about 0.14 grams per cubic centimeter or less.

12. The metal-air battery of claim 1, wherein the first insulating gas diffusion layer has an electrical resistivity of about 1 ohm-meter to about $10^{25}$ ohm-meters.

13. The metal-air battery of claim 1, wherein the negative electrode comprises first and second opposite surfaces,
wherein the ion conducting membrane is disposed on each of the first and second opposite surfaces of the negative electrode, and
wherein the positive electrode is disposed on each of first and second opposite surfaces of the ion conducting membrane.

14. The metal-air battery of claim 1, wherein the negative electrode comprises first and second opposite surfaces,
wherein the ion conducting membrane, which comprises at least one folded portion, surrounds the negative electrode and is disposed on each of the first and second opposite surfaces of the negative electrode,
wherein the positive electrode, which comprises at least one folded portion folded in a same direction as a bending direction of the ion conducting membrane, surrounds the ion conducting membrane and is disposed on each of first and second opposite surfaces of the ion conducting membrane, and
wherein the positive electrode current collector, which comprises the at least one folded portion which is folded in a same direction as a bending direction of the positive electrode, surrounds the positive electrode and is disposed on each of first and second opposite surfaces of the positive electrode.

15. The metal-air battery of claim 1, wherein the first insulating gas diffusion layer comprises first and second opposite surfaces,
wherein the positive electrode current collector, which comprises the at least one folded portion, surrounds the first insulating gas diffusion layer and is disposed on each of the first and second opposite surfaces of the first insulating gas diffusion layer,
wherein the positive electrode, which comprises at least one folded portion folded in a same direction as a bending direction of the positive electrode current collector, surrounds the positive electrode current collector and is disposed on each of first and second opposite surfaces of the positive electrode current collector,
wherein the ion conducting membrane, which comprises at least one folded portion folded in the same direction as a bending direction of the positive electrode, surrounds the positive electrode and is disposed on each of the first and second opposite surfaces of the positive electrode, and
wherein the negative electrode, which comprises at least one folded portion folded in a same direction as a bending direction of the ion conducting membrane, surrounds the ion conducting membrane and is disposed on each of first and second opposite surfaces of the ion conducting membrane.

16. The metal-air battery of claim 15, wherein the metal-air battery comprises a plurality of first insulating gas diffusion layers, and
wherein each of the positive electrode current collector, the positive electrode, the ion conducting membrane, and the negative electrode includes at least one folded portion folded in a same direction, surrounds each insulating gas diffusion layer of the plurality of insulating gas diffusion layers, and is repeatedly disposed on each of first and second opposite surfaces of each insulating gas diffusion layer of the plurality of insulating gas diffusion layers.

17. The metal-air battery of claim 16, wherein the positive electrode current collector comprises the at least one folded portion which is folded between a first insulating gas diffusion layer and a second insulating gas diffusion layer, and wherein the positive electrode current collector contacts each of the first insulating gas diffusion layer and the second insulating gas diffusion layer,
wherein each of the positive electrode, the ion conducting membrane, and the negative electrode is folded in a same direction as a bending direction of the positive electrode current collector, and
the negative electrode is folded more than once and disposed on the positive electrode and the ion conducting membrane.

18. A metal-air battery module comprising:
a plurality of the metal-air batteries of claim 1 stacked on one another.

19. A metal-air battery module comprising:
a top cell; and
at least one middle cell disposed between the top cell and a bottom cell,
wherein the top cell and the bottom cell each comprise
a negative electrode,
a positive electrode,
an ion conducting membrane disposed between the negative electrode and the positive electrode,
a positive electrode current collector disposed on a surface of the positive electrode and comprising a plurality of pores, and
an insulating gas diffusion layer disposed on an outer surface of the positive electrode current collector, and
wherein each middle cell comprises
a negative electrode,
a positive electrode,
an ion conducting membrane disposed between the negative electrode and the positive electrode,
a positive electrode current collector disposed on a surface of the positive electrode and comprising a plurality of pores,
a first insulating gas diffusion layer disposed on an upper surface of the positive electrode current collector, and
a second insulating gas diffusion layer disposed on a lower surface of the positive electrode current collector, and
wherein the positive electrode current collector comprises a folded portion forming a "U" shape, and the first and the second insulating gas diffusion layers are respectively positioned on each of the opposite surfaces of the folded positive electrode current collector.

* * * * *